United States Patent [19]

Jones, Jr.

[11] Patent Number: 4,534,576
[45] Date of Patent: Aug. 13, 1985

[54] APPARATUS FOR TRANSPORTING FIREWOOD

[76] Inventor: William J. Jones, Jr., P.O. Box 42, Caddo Gap, Ark. 71935

[21] Appl. No.: 471,133

[22] Filed: Mar. 1, 1983

[51] Int. Cl.³ .............................................. B62B 1/10
[52] U.S. Cl. ............................... 280/47.26; 232/43.1; 248/129; 312/45; 312/211
[58] Field of Search ................ 280/47.18, 47.2, 47.26, 280/47.27, 47.28; 312/211, 45, 290; 232/43.1, 44, 1 D; 248/129; 211/49 D, 59.1; 220/2, 230, 335

[56] References Cited

U.S. PATENT DOCUMENTS

| | | | |
|---|---|---|---|
| 79,564 | 7/1868 | Fagan | 220/2 |
| 1,011,327 | 12/1911 | Deaton | 206/123 |
| 1,317,577 | 9/1919 | Hoops | 280/47.26 X |
| 1,670,258 | 5/1928 | Hekrdle | 206/123 |
| 2,572,486 | 10/1951 | Isaac | 280/47.26 X |
| 2,921,609 | 1/1960 | Henderson et al. | 312/45 X |
| 3,420,540 | 1/1969 | Bird | 280/47.26 X |
| 3,809,448 | 5/1974 | Rakaska | 312/45 X |
| 3,923,159 | 12/1975 | Taylor et al. | 211/59.2 |

FOREIGN PATENT DOCUMENTS 2102352 2/1983 United Kingdom ............. 280/47.26

Primary Examiner—Joseph F. Peters, Jr.
Assistant Examiner—Michael Mar
Attorney, Agent, or Firm—Richards, Harris, Medlock & Andrews

[57] ABSTRACT

An apparatus and method for transporting firewood are provided. The apparatus includes a container having an upright portion and a lower portion extending outwardly from the upright portion. Edges of the upright portion define an upper opening, and edges of the lower portion define a lower opening. Firewood is placed in the upper opening and removed from the lower opening. Doors are provided to cover the upper and lower openings. Wheels are provided to transport the container from one location to another, and belt and sprocket assemblies are provided for enabling smooth transport of the container over obstacles.

3 Claims, 6 Drawing Figures

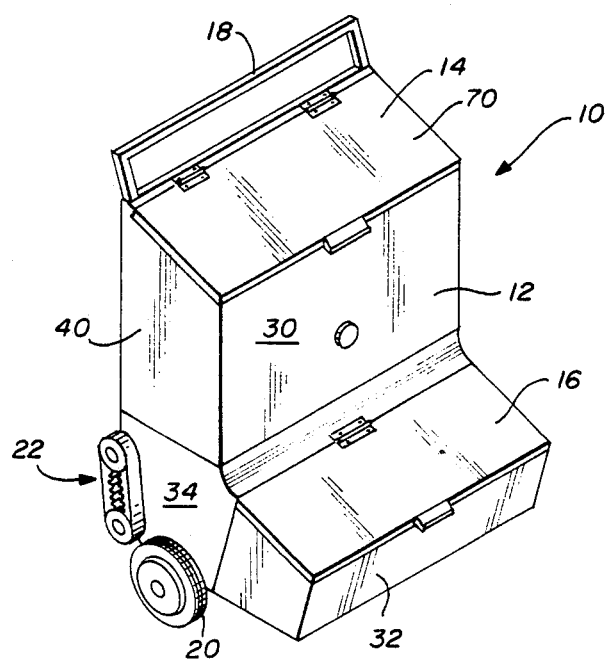
FIG. 1
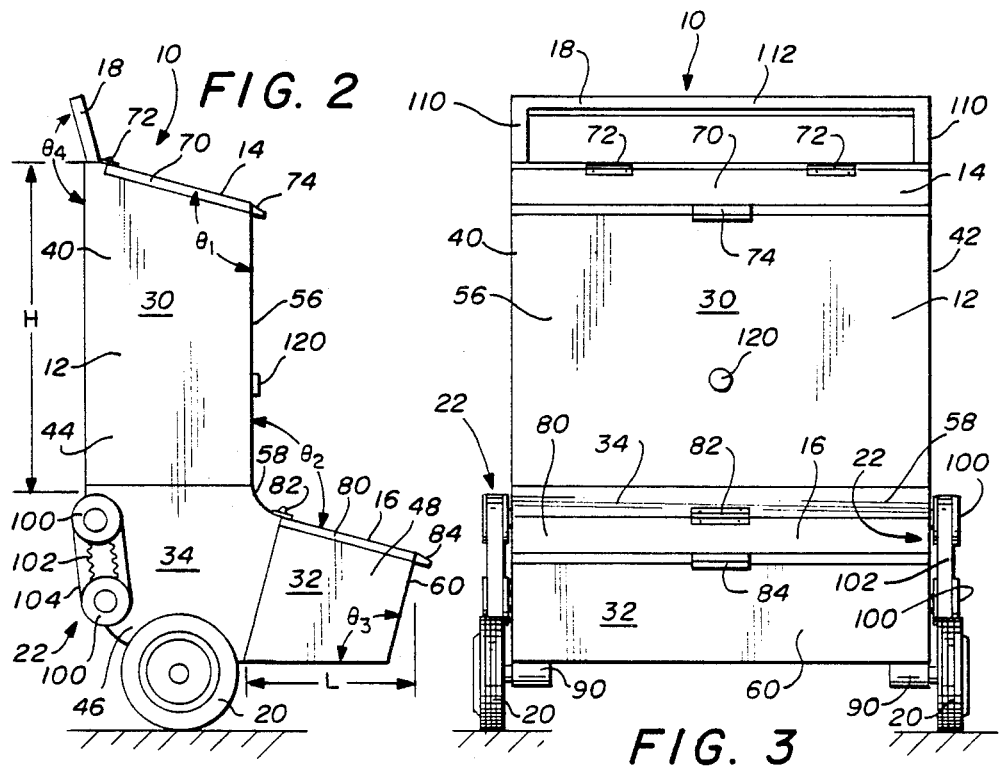
FIG. 2
FIG. 3

APPARATUS FOR TRANSPORTING FIREWOOD

TECHNICAL FIELD

The present invention relates to hand-propelled two-wheeled carts and methods for using same.

BACKGROUND ART

With the recent increases in the price of fossil fuels, wood has regained its popularity as a home heating fuel. This fact is evidenced by the current popularity of cast iron wood stoves and fireplaces in areas where wood is plentiful.

Transporting firewood from an outside wood pile to the wood stove, or fireplace, is a major chore, because firewood is bulky and heavy, and several trips may be required just for a single day's use. In addition, the bark of the firewood is often loose, and the area around the stove or fireplace often becomes littered with such debris. When more than a few pieces of firewood are brought inside, the stacking and storage of such wood can also present a problem.

Thus it can be seen that a need has arisen for a safe and convenient means for transporting firewood which alleviates these problems. In particular, a need has arisen for an apparatus and method for transporting relatively large quantities of firewood and storing such quantities of firewood in an easy to retrieve and neat manner.

SUMMARY OF THE INVENTION

The present invention provides an apparatus and method for transporting firewood which provide solutions to the aforementioned difficulties inherent in the transportation of firewood. The apparatus includes a wheeled container having an upright portion and a lower portion extending from the upright portion. Openings are provided in the upright and lower portions for the loading of wood and removal of wood from the container. Once the container is loaded with wood the container may be transported to the desired location. Then, the wood can be removed from the lower opening. As individual pieces of wood are removed, the remaining wood shifts downward into the lower portion of the container to present a fresh supply of wood to the user.

BRIEF DESCRIPTION OF THE DRAWINGS

A more complete understanding of the invention and its advantages will be apparent from the detailed description taken in conjunction with the accompanying drawings in which:

FIG. 1 is a perspective view of apparatus constructed in accordance with the present invention;

FIG. 2 is a side view of the apparatus of FIG. 1;

FIG. 3 is a front view of the apparatus of FIG. 1;

DETAILED DESCRIPTION

Figure 4:
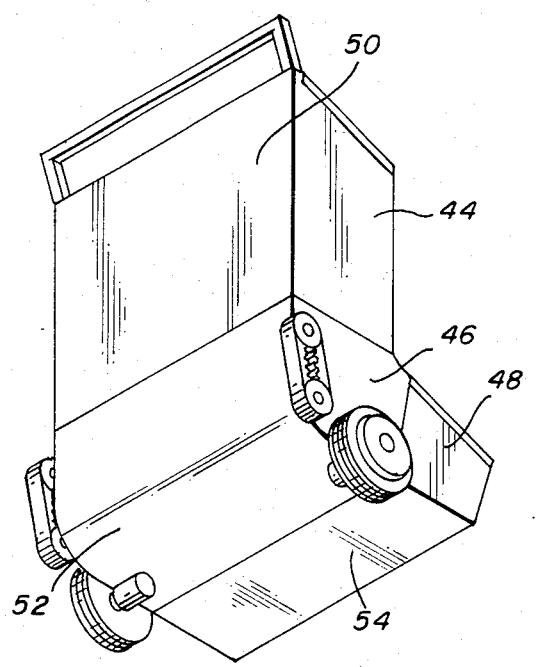
FIG. 4 is a perspective view of the apparatus of FIG. 1.

Referring initially to FIGS. 1, 2 and 3, apparatus 10 includes container 12, upper and lower doors 14 and 16, grip 18, wheels 20 and belt and sprocket assemblies 22. Apparatus 10 is generally in the form of a two-wheeled cart adapted for propulsion by the user grasping grip 18.

Container 12 is a hollow body having a rectangular upright portion 30 and an extended lower portion 32 joined by a curved portion 34. Lower portion 32 extends from upright portion 30 at approximately a 90 degree angle. As shown in FIG. 2, upright portion 30 is characterized by dimension H, and lower portion 32 is characterized by dimension L. In the preferred embodiment, H is approximately twice as large as L.

Container 12 includes first and second planar sides 40 and 42, each of which includes a vertical portion 44, sectoral portion 46 and horizontal portion 48. Referring now to FIGS. 2 and 3, vertical portions 44 are approximately twice as long as horizontal portions 48. As shown in FIG. 4, a planar back 50 extends between back edges of vertical portions 44, lower cylindrical surface 52 extends between outer circular edges of sectoral portions 46 and bottom 54 extends between lower edges of horizontal portions 48. Lower cylindrical surface 52 extends between back 50 and bottom 54. Referring now again to FIGS. 2 and 3, planar front 56 extends between front edges of vertical portions 44 and upper cylindrical surface 58 extends between inner circular edges of sectoral portions 46. End 60 extends between the outer edges of horizontal portions 48 and is joined to an outer edge of bottom 54.

Upper door 70 is a planar element pivotally attached to the upper edge of back 50 by means of hinges 72. Upper door 70 is sized to cover an opening formed by the upper edges of horizontal portions 44, back 50 and front 56. Handle 74 extends outwardly from the medial front edge portion of upper door 70.

Lower door 80 is constructed in similar fashion to upper door 70, being a planar element pivotally attached to the lower edge of upper cylindrical surface 58 by means of hinge 82. Handle 84 extends outwardly from the medial front edge portion of lower door 80. Lower door 80 is sized to cover a lower opening formed by the upper edges of horizontal portions 48 and end portion 60 and the lower edge of upper cylindrical surface 58.

Wheels 20 are rotatably attached at approximately the junction between lower cylindrical surface 52 and bottom 54. Each wheel 20 is carried by a stub axle 90.

First and second belt and sprocket assemblies 22 each include a pair of sprockets 100 and a toothed resilient belt 102. In preferred form, belt 102 is a timing belt and sprockets 100 are conventional timing belt pulleys. Sprockets 100 are attached to container 12 by means of shafts attached to container 12 at approximately the intersection of back 50 and lower cylindrical surface 52. Each belt 102 has a belt surface 104 spaced outwardly from container 12.

Grip 18 comprises arms 110 extending from opposite sides of the upper edge of back 50. Cross member 112 extends between the uppermost ends of arms 110.

As shown in FIG. 2, upper door 70 is disposed at an angle of $\theta_1$ with respect to front 56. In preferred form, $\theta_1$ is 120°. Lower door 80 is disposed at an angle of $\theta_2$ with respect to front 56. In preferred form $\theta_2$ is 60°, such that when doors 70 and 80 are in the closed positions, as shown in FIGS. 1, 2 and 3, they are parallel. End 60 slopes outwardly with respect to the bottom at an angle $\theta_3$. In preferred form $\theta_3$ is 120°, such that door 80 and end 60 are at an angle of 90° when door 80 is in the closed position. Grip 18 is disposed at an angle $\theta_4$ with respect to back 50, and in preferred form, $\theta_4$ is 155°.

Magnet 120 is attached to front 56 and positioned to contact a portion of lower door 80 when it is swung to the open position.

In the preferred embodiment of apparatus 10, container 12 is constructed of sheet steel welded to a tubular frame. Sides 40 are constructed of a continuous piece of steel, such that vertical portions 44, sectoral portions 46 and horizontal portions 48 are contiguous. Similarly, back 50, lower cylindrical surface 52 and bottom 54 are constructed of one piece. Front 56 and upper cylindrical surface 58 are likewise constructed of one piece.

Figure 5:
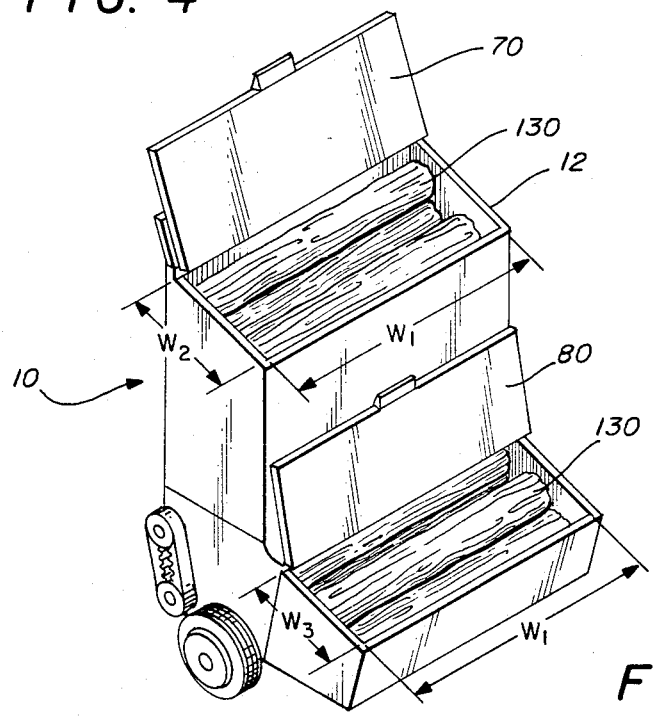
FIG. 5 is a perspective view of the apparatus of FIG. 1 shown loaded with firewood.

In operation, apparatus 10 is used to transport firewood from a first location to a second location. At the first location, container 12 is loaded with firewood pieces 130 until it is substantially full, as shown in FIG. 5. When upper door 70 is in the open position, an upper opening is exposed having the dimensions $W_1$ and $W_2$. $W_1$ and $W_2$ are sized to accommodate individual pieces 130 of wood, and in the preferred embodiment, $W_1$ is 30 inches and $W_2$ is 11 inches. Similarly, when lower door 80 is in the open position, a lower opening is exposed having dimensions $W_1$ and $W_3$ chosen to accommodate removal of pieces 130. In preferred form, $W_1$ is 30 inches and $W_2$ is 12 inches.

An important feature of the invention is the gravity feed of firewood from the upright portion of the container to the lower portion. As pieces 130 are removed from the lower opening, gravity causes the remaining pieces of firewood to shift downwardly. Whenever a piece 130 is removed from the lower opening, a fresh piece 130 takes its place.

Figure 6:
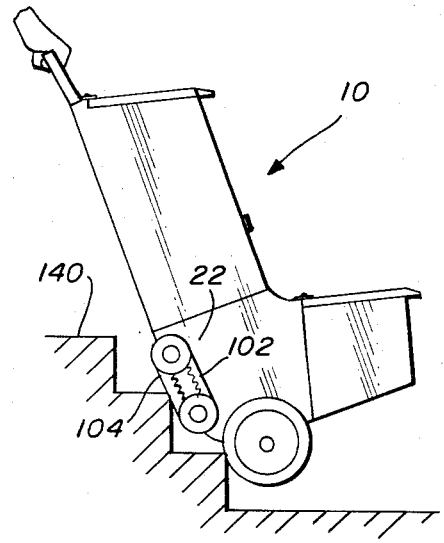
FIG. 6 is a side view of the apparatus of FIG. 1 being transported along stairs.

As shown in FIG. 6, belt and sprocket assemblies 22 aid in transporting the apparatus over obstacles, such as stairs 140. Surface 104 of belt 102 is translatable relative container 12 and engages the apex of each stair step, allowing the smooth ascent or descent of stairs 140.

While certain embodiments of the present invention have been described in detail herein and shown in the accompanying drawings, it will be evident that various further modifications are possible without departing from the scope of the invention.

I claim:

1. An apparatus for transporting firewood comprising:
    a container including:
        first and second planar sides, each side including a vertical side portion and a forwardly extending horizontal side portion joined by a sectoral side portion, the vertical side portion being approximately twice as long as the horizontal side portion;
        a planar back portion extending between back edges of the vertical side portions;
        a planar front portion extending between front edges of the vertical side portions;
        an upper curved surface extending between inner circular edges of the sectoral side portions;
        a lower curved surface extending between outer circular edges of the sectoral side portions;
        a bottom portion extending between lower edges of the horizontal side portions;
        an end portion extending between outer edges of the horizontal side portions;
        the upper edges of the vertical side portions, back portion and front portion forming an upper opening; and
        the upper edges of the horizontal side portions and end portion and a lower edge of the upper curved surface forming a lower opening;
        an upper door pivoted to the upper edge of the back portion sized to cover the upper opening;
        a lower door pivoted to the lower edge of the upper curved surface sized to cover the lower opening;
        wheels attached to stub axles extending from the lower curved surface;
    a grip including:
        two arms extending from opposite sides of the upper edge of the back portion; and
        a cross member extending between the uppermost ends of the arms.

2. The apparatus of claim 1 further comprising handles extending from the medial front edge portions of the upper and lower doors.

3. The apparatus of claim 1 further comprising a belt and sprocket assembly attached to each sectoral side portion of the container adjacent the lower curved surface.

* * * * *